(12) United States Patent
Masuzawa et al.

(10) Patent No.: US 6,700,247 B2
(45) Date of Patent: Mar. 2, 2004

(54) THIN TYPE PERMANENT MAGNET GENERATOR AND DISKETTE INCORPORATING SAME

(75) Inventors: Masahiro Masuzawa, Fukaya (JP); Masahiro Mita, Fukaya (JP); Fumio Kimura, Gyoda (JP); Toshiko Takahashi, Fukaya (JP)

(73) Assignee: Hitachi Metals, Ltd., Tokyo (JP)

( * ) Notice: Subject to any disclaimer, the term of this patent is extended or adjusted under 35 U.S.C. 154(b) by 79 days.

(21) Appl. No.: 09/862,727

(22) Filed: May 23, 2001

(65) Prior Publication Data

US 2002/0008429 A1 Jan. 24, 2002

(30) Foreign Application Priority Data

May 30, 2000 (JP) .......................... 2000-159440
Feb. 19, 2001 (JP) .......................... 2001-041430

(51) Int. Cl.[7] .......................... H02K 7/10; H02K 21/12; H02K 1/22
(52) U.S. Cl. .................. 310/80; 310/156.32; 310/268
(58) Field of Search .................. 310/156.32, 268, 310/156.33, 254, 261, 40 MM, 90, 67 R, 953; 360/133

(56) References Cited

U.S. PATENT DOCUMENTS 5,030,864 A * 7/1991 Van Hout et al. .......... 310/268
5,159,182 A 10/1992 Eisele .......................... 235/492
6,078,466 A * 6/2000 Obara .......................... 310/67 R

FOREIGN PATENT DOCUMENTS

| EP | 0978930 A1 | 2/2000 | |
|---|---|---|---|
| JP | 7-500238 | 1/1995 | |
| JP | 2000116088 A | * 4/2000 | .......... H02K/21/12 |

OTHER PUBLICATIONS

Electric Motors and Motor Controls; Jeff Keljik; Delmar Publishers; 1995; pp. 139–142.*

* cited by examiner

Primary Examiner—Thomas M. Dougherty
Assistant Examiner—Guillermo Perez
(74) Attorney, Agent, or Firm—Sughrue Mion, PLLC

(57) ABSTRACT

Disclosed is a permanent magnet generator incorporated in a 3.5" diskette that can be used as an input/output adapter for memory cards that can generate a power generation output of 40 mW or more when the rotor of the generator is rotated at 300 rpm. The permanent magnet generator has such a construction that rotor magnetic poles are provided only on one end face of a disc-shaped permanent magnet serving as a rotor, a plurality of stator magnetic poles are provided only on that end face of the permanent magnet in such a manner as to face the rotor magnetic poles, and a soft magnetic hub is fixedly fitted to the other end face of the permanent magnet. Even when a bonded NdFeB magnet is used as the permanent magnet, a sufficient power can be produced.

25 Claims, 7 Drawing Sheets

212

212

212

THIN TYPE PERMANENT MAGNET GENERATOR AND DISKETTE INCORPORATING SAME

BACKGROUND OF THE INVENTION

1. Field of the Invention

The present invention relates generally to a thin type permanent magnet generator, and more particularly to a thin type permanent magnet generator that can be incorporated in a diskette designed to be used by inserting into a floppy disk drive, and when a memory, such as a magnetic card, is installed in the diskette, serves as a power source for the memory to write and read data in the memory.

2. Description of the Related Art

Medical information, such as personal medical checkup results, is stored in an IC card, from which medical institutions can retrieve such information for use in the treatment of a patient, and can store in the card the contents of his case records after some medical treatments. Plans are also now under way to use IC cards as electronic money. Under the plans, data on a customer's bank account, password, and the balance of his account, if necessary, are stored in an IC card, by means of which payment is made on-line every time the card holder spends money.

It has been proposed that an enormous amount of video information handled by a digital camera be stored in a flash memory that has a capacity as large as several megabytes to 10 megabytes. A flash memory containing the video information taken by a digital camera can be connected to a personal computer for subsequent video processing. The use of a flash memory to record the video information taken by a digital camera may eliminate an additional external memory unit, such as MOs.

The widespread use of IC cards or flash memories, however, has been deterred by the need for special input/output (I/O) devices dedicated for such media. Since most commonly used I/O devices for personal computers are floppy disk drives, particularly 3.5" floppy disk drives, the use of 3.5" floppy disks as an I/O device for IC cards and flash memories could spur their proliferation. In fact, methods for writing and reading data into and from an IC card or flash memory are being studied, and adapters that can be inserted or incorporated in 3.5" floppy disk drives have already been proposed. A conventional type of 3.5" floppy disk drive has a magnetic head to read and write information from and into a 3.5" diskette, and a drive shaft to cause the diskette to rotate at 300 rpm, but it has no power feeding terminals. In diskette-shaped adapters, a button battery is incorporated to power the built-in CPU. A battery, which depletes as it is used, has to be replaced with a new one every four to five months at the longest.

Introduction of a 3.5" floppy disk in which a generator is incorporated and driven by the rotation of the drive shaft of a 3.5" floppy disk drive would prove very useful, giving momentum to the proliferation of IC cards and similar media. In order to implement a diskette which serves as an information I/O device in conjunction with a memory card having magnetic stripes, such as an IC card, a space for housing a memory card must be provided in the diskette. The typical size of a standard memory card is 85 mm in length, 54 mm in width, and 0.8 mm in thickness. Since the thickness given above ignores the embossed part for raised letters of the memory card, its actual thickness is a little bit thicker. To provide a space for a memory card and a permanent magnet type generator in a 3.5" diskette having a thickness of 3.5 mm and two 0.2 mm-thick covers on both sides, the thickness of the generator must be not more than 2.0 mm, allowing for the thickness of the memory card of 0.8 mm and some clearance for loading and unloading the card.

The thickness t allowed for the permanent-magnet generator to be incorporated in a 3.5" diskette is 2.0 to 2.5 mm, as stated earlier. The size (width and length) allowed for the generator is up to the size of the 3.5" diskette, or 90 mm in diagonal length d (mm) on the end face thereof. With t being 2.3 mm and d being 90 mm, the aspect ratio (t/d) is approximately 2.6%.

Commercially available motors or generators having a small thickness include spindle motors for FDD. Some of commercially available thin motors are shown in TABLE 1, where the diagonal length d, thickness t, and aspect ratio (t/d) thereof are also shown, together with the locations of gaps for the motor permanent magnets. As is evident from TABLE 1, the aspect ratio of a generator that can be incorporated in a 3.5" diskette is extremely small, compared with commonly used thin motors and generators.

TABLE 1

| Type | Gap | Diagonal length d (mm) | Thickness t (mm) | Aspect ratio t/d (%) |
|---|---|---|---|---|
| FDD spindle motor for notebook computer | Radial | 18 | 4 | 22.2 |
| FDD spindle motor for notebook computer | Radial | 60 | 3.2 | 5.3 |
| FDD spindle motor for notebook computer | Axial | 40 | 3 | 7.5 |
| FDD spindle motor for desk-top computer | Radial | 50 | 5 | 10.0 |
| FDD spindle motor for desk-top computer | Radial | 50 | 8 | 16.0 |
| Cooling fan motor | Radial | 30 | 15 | 50.0 |
| Generator built into diskette | Axial | 90 | 2.3 | 2.6 |

Incorporating a generator into a 3.5" diskette has already been proposed, as in U.S. Pat. No. 5,159,182 and Published Japanese Translation of PCT International Publication for Patent Application Hei-7(1995)-500238.

U.S. Pat. No. 5,159,182 discloses that a generator is incorporated into a 3.5" diskette, and that the generator has a rotor and a stator, but does not disclose any further details of its construction. In Published Japanese Translation of PCT International Publication for Patent Application Hei-7 (1995)-500238, it is disclosed that a permanent magnet rotating together with a hub is provided as a generator built into a 3.5" diskette; the hub having the permanent magnet is caused to rotate by the drive shaft of a floppy disk drive. It is also disclosed that the permanent magnet is of a cylindrical shape, and magnetized in the direction of the rotational shaft so that a large number of magnetic poles are provided on both end faces of the cylindrical permanent magnet. The magnetic poles on the stator yokes are arranged in such a manner as to sandwich the cylindrical permanent magnet, and a stator coil is provided between the stator yokes on both sides of the cylindrical permanent magnet.

Now, suppose a permanent magnet generator of a size that can be incorporated into a 3.5" diskette, as disclosed in Published Japanese Translation of PCT International Publication for Patent Application Hei-7(1995)-500238, where a cylindrical rotor permanent magnet is magnetized in the direction of the rotational shaft so that a large number of magnetic poles are provided on both end faces of the cylindrical permanent magnet. In this case, stator magnetic poles are arranged on both sides of the end faces of the cylindrical permanent magnet via small magnetic gaps. Since the thickness allowed for the generator is 2.0 to 2.5 mm, the thickness allowed for the permanent magnet is only 0.5 to 0.8 mm. In a magnet having a short distance between the magnetic poles, even when a material having a large coercive force is used, the resulting magnet has a small magnetomotive force. Since both end faces of the cylindrical permanent magnet face stator magnetic poles, a gap of a few tenth of millimeters is needed to allow the rotor to rotate without mechanical interference with the stator magnetic poles. To ensure the gap of this size, the thickness of the stator magnetic poles must be not more than 0.5 mm, assuming that the thickness of the permanent magnet is 0.5 mm. This thickness is not enough to allow magnetic flux to pass. In Published Japanese Translation of PCT International Publication for Patent Application Hei-7(1995)-500238, furthermore, a long magnetic path is required because the stator coil is provided away from the stator magnetic poles. This, together with the use of thin stator magnetic poles, has led to an increased magnetic resistance, resulting in a generator having small output.

The present inventors already proposed a diskette incorporating a new permanent magnet generator that can be used for the above purpose, and filed an application for patent as U.S. patent application Ser. No. 09/369,420 on the filing date of Aug. 6, 1999 (European Published Patent No. EP0978930 A1, the date of publication: Feb. 9, 2000). The diskette for which the patent application was filed is shown in FIG. 13. A diskette 9 in the figure has a permanent magnet generator 90 incorporated around a hub 911 at the center thereof, and a ring-shaped permanent magnet 912 having magnetic poles on the outer circumferential surface is provided rotatably together with the hub. A generator stator 92 is provided inside the diskette on the outer periphery of the permanent magnet 912 of the rotor 91 with a magnetic gap between the magnetic poles on the outer circumferential surface of the permanent magnet 912. In FIG. 13, numeral 95 refers to a memory card housing space, 96 to a card contact terminal, 97 to an input/output terminal, 98 to CPU, and 99 to a stabilized power supply circuit, respectively.

The permanent magnet generator for which the patent application has been filed as U.S. patent application Ser. No. 09/369,420 has a rotor having magnetic poles on the outer circumferential surface of the ring-shaped permanent magnet, and stator magnetic poles arranged on the outer circumferential surface at locations facing the rotor magnetic poles, and having magnetic pole teeth extending radially outward from each of the stator magnetic poles. To increase the output of the permanent magnet generator, a permanent magnet having the largest possible coercive force and residual magnetic flux density, or more preferably an anisotropic sintered NdFeB magnet is used. The coils wound on each of the magnetic pole teeth are as many as 6,000 turns in total.

Nevertheless, the rotation of the magnet is normally as low as 300 rpm because the rotation of the floppy disk drive is used as it is to cause the rotor to rotate. As a result, the generated power of the permanent magnet is 20 mW at best despite the use of a sintered NdFeB magnet having excellent magnetic characteristics as the rotor permanent magnet.

The present inventors studied to obtain a large output, and found that the output cannot be substantially increased with the generator as disclosed in U.S. patent application Ser. No. 09/369,420 unless the revolution of the rotor is increased. This is attributed to the fact that the number of magnetic flux entering the magnetic pole teeth is small due to the small surface area of each magnetic pole of the rotor permanent magnet used, and that provision of a magnetic shield to prevent the adverse effect of the large magnetic flux leakage from the magnetic poles of the rotor permanent magnet on the surroundings tends to increase magnetic loss, resulting in reduction in the amount of effective magnetic flux.

SUMMARY OF THE INVENTION

It is therefore an object of the present invention to provide a permanent magnet generator of a thin type (aspect ratio (thickness t/diagonal length d): not more than 6%) having a large generating power that can reduce or eliminate the aforementioned drawbacks.

It is another object of the present invention to provide a thin type permanent magnet generator in which the output of the permanent magnet can be fully utilized by reducing the magnetic gap to reduce the magnetic resistance of the magnetic circuit, thereby increasing the permeance coefficient of the permanent magnet.

It is still another object of the present invention to provide a thin type permanent magnet generator that has essentially low magnetic flux leakage.

It is a further object of the present invention to provide a durable thin type permanent magnet generator.

It is a further object of the present invention to provide a diskette incorporating the aforementioned thin type permanent magnet generator.

It is a further object of the present invention to provide a diskette incorporating the thin type permanent magnet generator that can generate sufficient output with the revolution of the floppy disk drive left unchanged.

It is still a further object of the present invention to provide a diskette incorporating a thin type permanent magnet generator that has so low magnetic flux leakage that even when a memory card housing space is provided adjacent to the permanent magnet generator, the magnetic flux leaked from the permanent magnet generator does not adversely affect the memory card inserted into the space.

The thin type permanent magnet generator that can be incorporated into the diskette according to the present invention comprises a disc-shaped rotor having a disc-shaped hub made of a soft magnetic material that is rotatable around the rotational shaft, and a flat ring-shaped permanent magnet concentrically fitted to an end face of the hub; the permanent magnet being axially magnetized in such a manner that each end face thereof has a plurality of magnetic poles having circumferentially alternately different polarities, the magnetic poles on the one end face of the permanent magnet being magnetically short-circuited by the hub, and the magnetic poles on the other end face serving as rotor magnetic poles, and a stator having on one end thereof each of the stator magnetic poles that can face the rotor magnetic poles at the same pole intervals via an axial gap; with a plurality of magnetic pole teeth extending radially outward from the stator magnetic poles; the magnetic pole teeth being connected to each other at the other end thereof by a yoke made of a soft magnetic material and having coils wound on the middle part thereof; and the ratio of the generator thickness/the diagonal length of the generator end face being not more than 6%.

In the above-mentioned thin type permanent magnet generator, it is desirable in preventing magnetic flux from leaking from the permanent magnet to the outside of the generator through the side of the hub outer periphery that the outer periphery of the hub protrudes more than 0.3 mm from the outer periphery of the permanent magnet. It is also desirable in preventing magnetic flux leakage from the permanent magnet to the outside of the generator through the inner opening of the stator tooth tips that the tips of the magnetic pole teeth radially inward protrude by more than 0.3 mm from the central opening of the ring-shaped permanent magnet. It is also desirable in preventing magnetic flux from leaking from the permanent magnet to the back outside of the stator magnetic teeth that the end face of the permanent magnet which end face is not covered by the magnetic teeth on the side of the stator is covered by a piece made of a soft magnetic material.

In the above-mentioned thin type permanent magnet generator, it is effective in increasing the generator output that the gap or distances between the adjacent stator magnetic poles of each of the magnetic pole teeth is 0.3 to 1.0 mm because it causes the magnetic flux of the permanent magnet to effectively cross the stator coil.

In the above-mentioned thin type permanent magnet generator, each of the magnetic pole teeth extends radially outward from the stator magnetic poles, and has a step difference in the axial direction between the portion having the stator magnetic pole and the portion on which the stator coil is wound. In other words, the magnetic pole tooth of the stator is bent so that the step difference in the axial direction is produced between the portion facing the magnet and the intermediate portion on which the stator coil is wound. Or, it is desirable that separate members be assembled in such a manner as to form a step difference. When the magnetic pole tooth is bent so as to form a step difference, it is desirable that the bent portion should have an inclined portion, with the inclined portion is inclined at an angle of 30 to 60 degrees with respect to the length direction of the entire magnetic pole teeth.

By providing a step difference on the magnetic pole tooth, a space for winding a coil is accommodated in the generator, thereby the required coil can be wound on the magnetic pole tooth without increasing the thickness of the generator. Thus, a sufficiently large generator output can be obtained.

The permanent magnet used in the present invention should preferably be a bonded magnet containing SmFeN or NdFeB magnetic powders, or a sintered NdFeB magnet, or more preferably be a bonded NdFeB magnet containing NdFeB magnetic powders.

In the thin type permanent magnet generator according to the present invention, the hub should preferably be supported by an anti-friction bearing so that the hub can be rotated around the rotational shaft. The hardness of the portion of the hub where the hub comes in contact with the balls of the anti-friction bearing should preferably be not less than HRC 35. Furthermore, the portion of the hub where the hub comes in contact with the balls of the anti-friction bearing should preferably have a U-shaped groove.

The diskette incorporating the thin type permanent magnet generator according to the present invention comprises a diskette case having a magnetic disk shape, and a disc-shaped rotor having a disc-shaped hub made of a soft magnetic material that is caused to rotate around a rotational shaft by an external drive mechanism, and a flat ring-shaped permanent magnet concentrically fitted to one end of the hub;

the permanent magnet being magnetized in the axial direction so that a plurality of magnetic poles having alternately different polarities in the circumferential direction are arranged on each end face of the permanent magnet: the magnetic poles on one end face of the permanent magnet being magnetically short-circuited by the hub, and the magnetic poles on the other end face of the permanent magnet operating as rotor magnetic poles, and a stator having a plurality of stater magnetic pole teeth having on one end thereof each of a plurality of stator magnetic poles that can face the rotor magnetic poles at the same pole intervals via an axial gap, and extending radially outward from the stator magnetic poles; the magnetic pole teeth being connected at the other end to each other by a yoke made of a soft magnetic material and having stator coils wound on the intermediate portion thereof; and the ratio of the generator thickness/diagonal length on the end face of the generator being not more than 6%.

In the above thin type permanent magnet generator, the thickness of the rotor permanent magnet in the magnetization direction should preferably be not less than 10% and not more than 30% of the thickness of the diskette, and the gap between the magnet and the stator magnetic poles should preferably be not less than 2% and not more than 15% of the thickness of the diskette, more preferably be not less than 5% and not more than 15%, and more specifically the thickness of the magnet in the magnetization direction should preferably be 0.3 to 1.0 mm, and the gap between the magnet and the stator 0.07 to 0.5 mm.

In the diskette according to the present invention, a memory card housing space should preferably be provided in the diskette case, adjoining the permanent magnet generator, and the end face of the permanent magnet generator on the side of the magnetic pole teeth having the stator magnetic poles should preferably be on the side of the memory card housing space.

That is, since a flat ring-shaped rotor permanent magnet can be used, and rotor magnetic poles are provided on one end face thereof in the thin type permanent magnet generator according to the present invention, the area of the rotor magnetic poles can be increased, and thus a large amount of magnetic flux is available. Furthermore, since all the stator magnetic poles are arranged on only one end face of the rotor permanent magnet, the thickness of the magnetic pole teeth having the stator magnetic poles can be increased, and the cross-sectional area thereof can be increased. As a result, the effective amount of magnetic flux contributing to power generation can also be increased. Moreover, since the hub made of a soft magnetic material is bonded to the other end face of the rotor permanent magnet, the permanent magnet is sandwiched between the hub and the magnetic pole teeth. This helps reduce magnetic field leakage from the permanent magnet to the outside (for example, into the memory card housing space provided adjacent to the permanent magnet generator or to the outside of the diskette case). As a result of these, the effective amount of magnetic flux contributing to power generation can be increased, and thereby a large power output can be obtained. Thus, the power generation output that has heretofore been 3 V, 20 mW can be increased to more than 5 V, 40 mW.

DETAILED DESCRIPTION OF THE PREFERRED EMBODIMENTS

Figure 1:
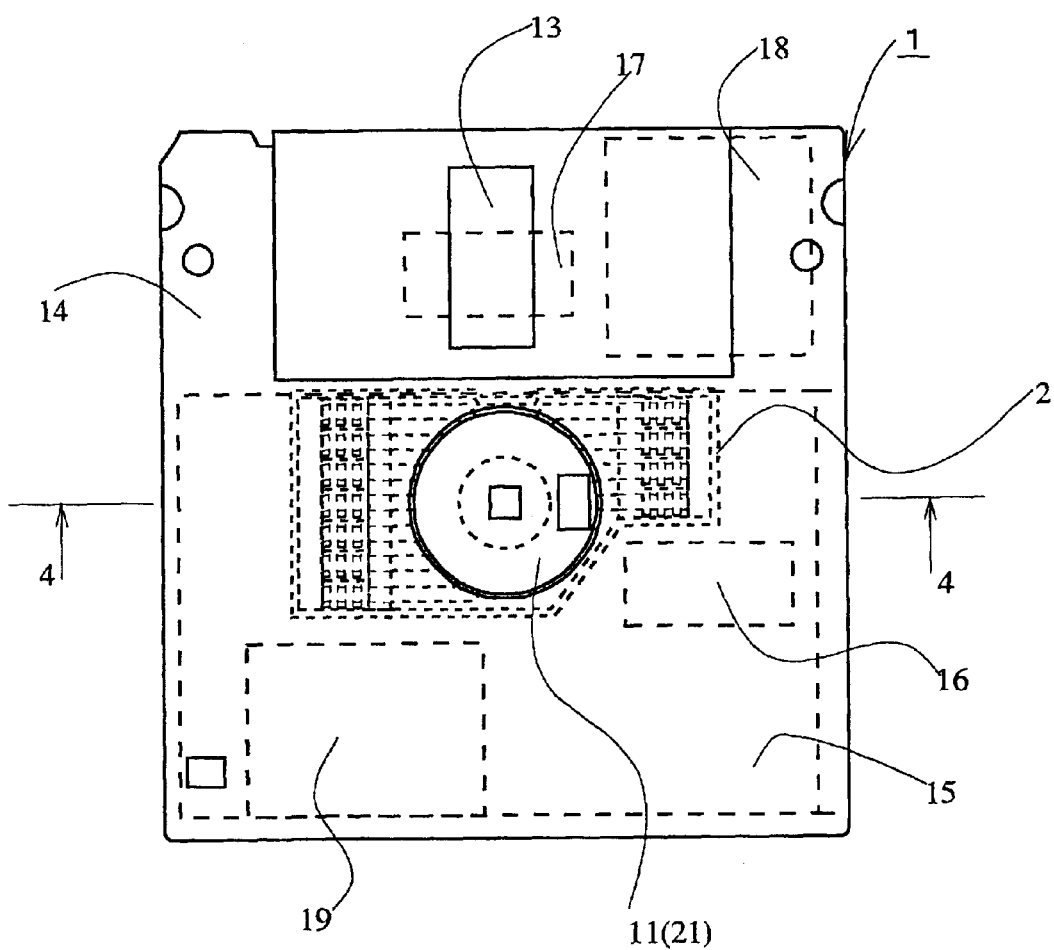
FIG. 1 Is a plan view of a diskette incorporating a permanent magnet generator according to an embodiment of the present invention.

First, the construction of a diskette incorporating a permanent magnet generator according to the present invention will be described in the following. Although the following description is focused on a diskette that can be loaded on a 3.5" floppy disk drive, it is needless to say that the present invention can be applied to a diskette of other sizes and constructions, as is evident from the following description. A 3.5" diskette (what is normally called 3.5" floppy disk) 1 has such a construction as shown in a plan (bottom) view of FIG. 1, encased in a plastic case of 94 mm in length, 90 mm in width and 3.5 mm in thickness. A plan view of the diskette, with the rear plate thereof removed, is shown in FIG. 2. On one end of the case provided is a head slot 13 through which an input/output magnetic head can magnetically contact the disk. A hub 11 for transmitting the rotation of the drive shaft of the floppy disk drive is provided almost at the center of the case. A floppy disk would be fitted coaxially to the hub so that it can rotate together with the hub. The diskette shown in FIGS. 1 and 2, which is used as an input/output device for a memory card, has a space 15 for inserting a memory card and a card contact terminal 16 for exchange of information with the memory card.

An input/output terminal 17 for exchange of information between the diskette and the magnetic head of the floppy disk drive is provided near the head slot 13 through which the magnetic head accesses the terminal. A CPU 18 for processing information between the input/output terminal 17 and the card contact terminal 16 is provided as necessary. The permanent magnet generator 2, which is used as a drive power source for driving the CPU 18 and the card contact terminal 16, requires rectified and stabilized power because the electric power generated by the generator may sometimes contain ripples, etc. A stabilized power supply circuit 19 is therefore incorporated in an output line of the generator 2 provided in the diskette.

The rotor 21 of the permanent magnet generator 2 is caused to rotate as the hub 11 is engaged with the drive shaft of the floppy disk drive and rotates. In the case of a 3.5" floppy disk drive, the drive shaft thereof is normally rotated at 300 rpm. Since the hub 11 is engaged with the drive shaft of the floppy disk drive in this way, the construction of the portion at which the hub 11 is engaged with the drive shaft should preferably be the same as that of the hub of a normal diskette.

As the memory card, a card having a size of a normal credit card, that is, 85 mm in length, 54 mm in width and 0.8 mm in thickness, as is found in IC cards and typical magnetic cards, can be used. Or, what is called the smart medium can also be used for this purpose.

Figure 2:
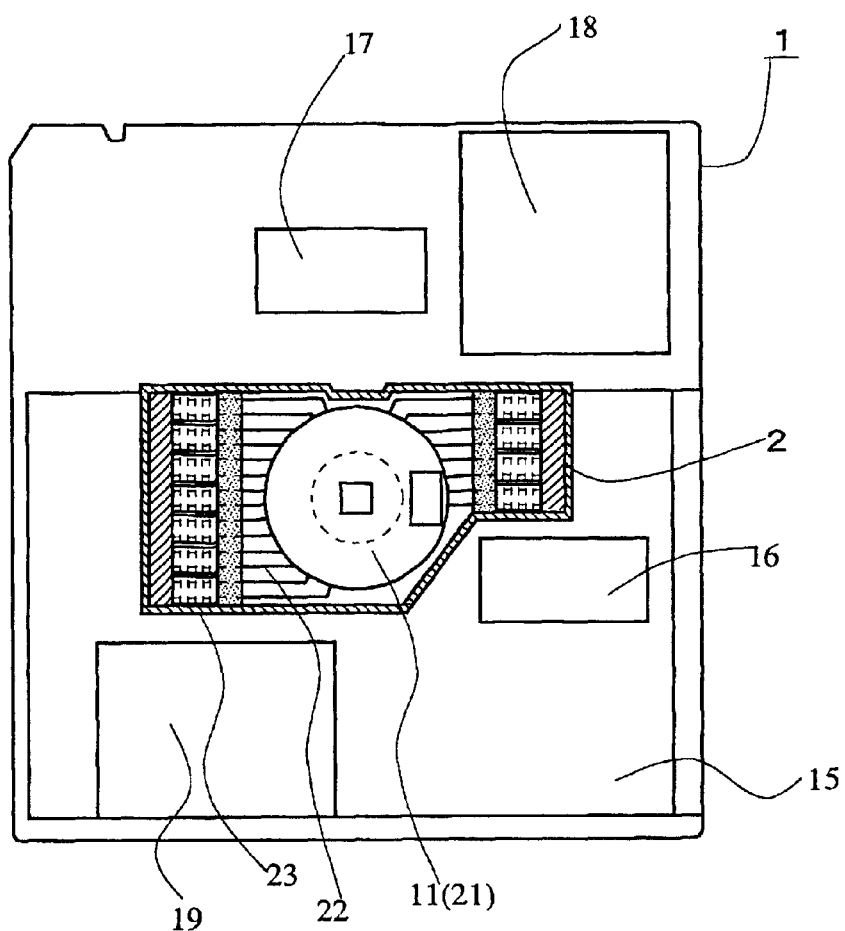
FIG. 2 is a plan view of the diskette shown in FIG. 1, with the rear plate thereof removed.

When the permanent magnet generator is disposed at such a location that it overlaps with the memory card housing space within a plane, as shown in FIG. 1, and a diskette is assumed to have the same size as a 3.5" diskette, then the permanent magnet generator must be about 2.3 mm to be housed in a 3.5-mm thickness of the diskette, allowing for a 0.4-mm thickness required for two diskette case covers each requiring a thickness of 0.2 mm.

When a smart medium that is smaller than an IC card is used as the memory card, arrangement can be made to prevent the memory card housing space 15 and the generator 2 from being overlapped, as described earlier. The thickness of the generator in the direction of the rotating shaft can therefore be increased up to about 3 mm.

Needless to say, when the shape of diskette is slightly thicker that a 3.5" diskette, 4.0 to 4.5 mm, for example, the thickness allowed for the generator can be increased to 3.5 to 4.0 mm.

Figure 3:
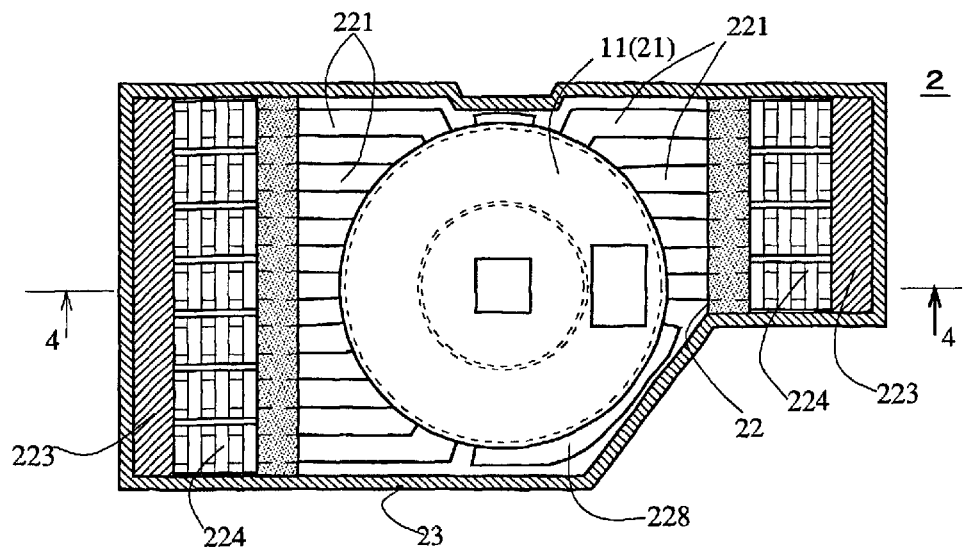
FIG. 3 is a plan view of a permanent magnet generator used in the present invention.
Figure 4:
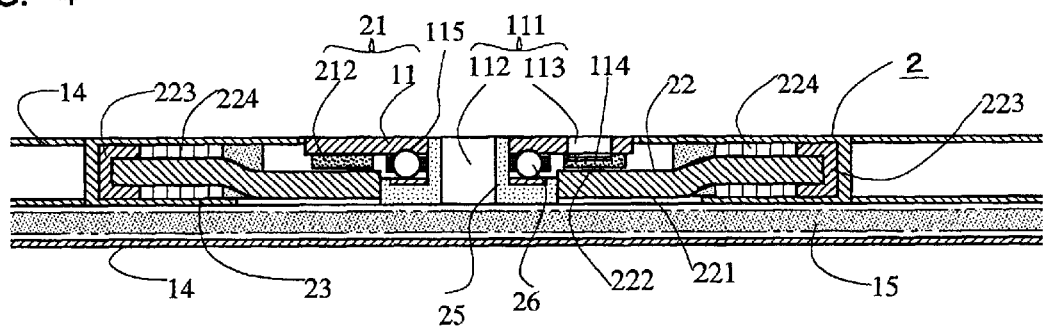
FIG. 4 is a cross-sectional view taken along line 4—4 of FIG. 3, partially illustrating the 4—4 cross section of FIG. 1.
Figure 5:
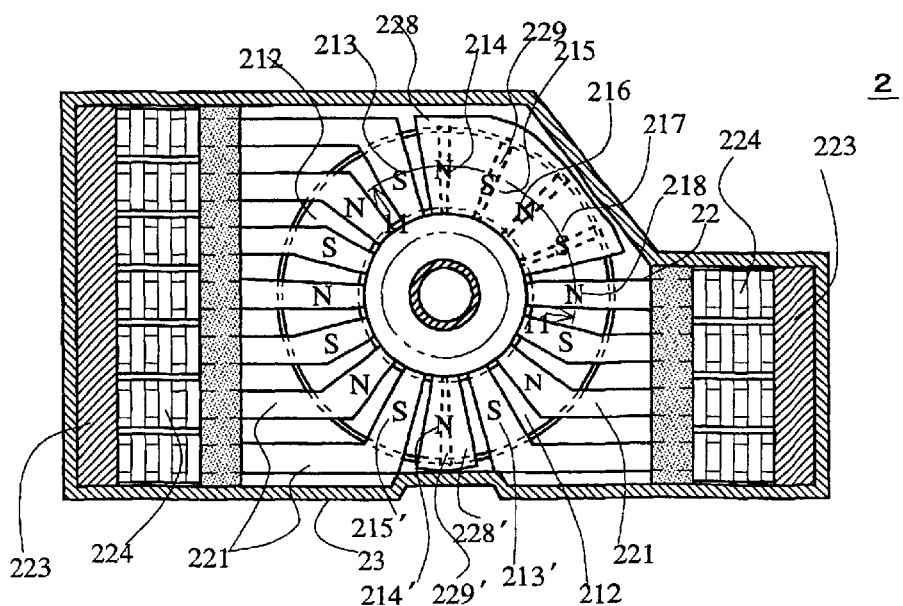
FIG. 5 is a bottom view of a permanent magnet generator used in the present invention, with the bottom part of the generator housing removed.
Figure 6:
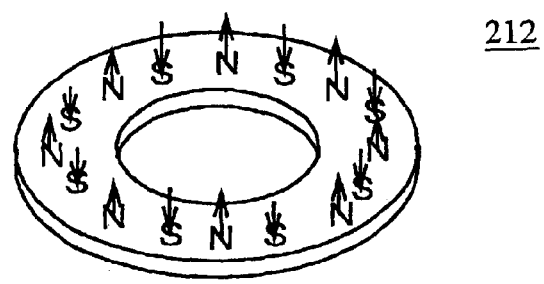
FIG. 6 is a perspective view of the flat ring-shaped permanent magnet used in the present invention.
Figure 7:
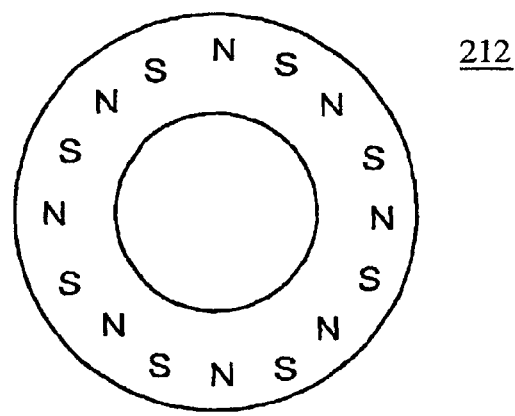
FIG. 7 is a plan view of the flat ring-shaped permanent magnet used in the present invention.
Figure 8:
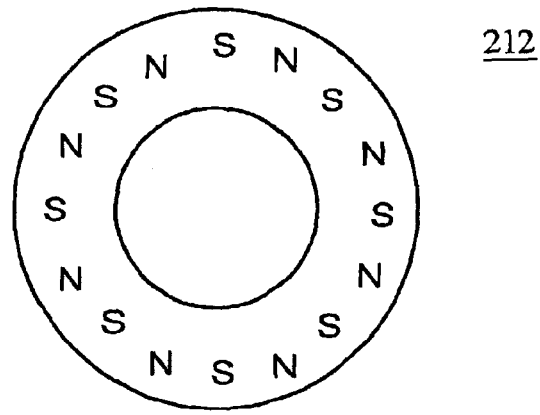
FIG. 8 is a bottom view of the flat ring-shaped permanent magnet used in the present invention.

In the diskette 1 incorporating a permanent magnet generator according to the embodiment of the present invention, a permanent magnet generator 2 is fitted around the hub 11 in the middle of the diskette 1. A plan view (as seen from the side of the hub 11), a cross-sectional view and a bottom view (as seen from the opposite side of the hub 11) of the permanent magnet generator are shown in FIGS. 3, 4 and 5. The cross-sectional view of FIG. 4 is also a partially cross-sectional view of FIGS. 1 and 2 where the diskette cover 14, the memory card housing space 15, etc. are shown. A rotor 21 of the generator 2 is fixedly fitted to one end face of the hub 11 and can be rotated together with the hub 11. The rotor 21 of the generator has a flat ring-shaped permanent magnet 212 that can be rotated around the rotating axis thereof. The flat ring-shaped permanent magnet 212 has a plurality of rotor magnetic poles arranged in the circumferential direction on one end face in the axial direction; the rotor magnetic poles having alternately different polarities in the circumferential direction. A perspective view of the flat ring-shaped permanent magnet 212 that is a preferred embodiment of the present invention is shown in FIG. 6, an upper plan view thereof in FIG. 7, and a bottom view thereof in FIG. 8. The flat ring-shaped permanent magnet 212 is magnetized in the axially alternately opposite directions so that the magnetic poles adjoining each other in the circumferential direction on an end face thereof, as shown in FIGS. 6, 7 and 8. That is, the flat ring-shaped permanent magnet 212 has magnetic poles of polarities of N, S, N, S,—clockwise when seen from above in FIG. 7 on one end face thereof, and magnetic poles of polarities of S, N, S, N,—clockwise when seen from above in FIG. 8 on the other end face thereof. The hub 11, which should preferably be made of a soft magnetic material and formed into a flat disc shape, is often called as "soft magnetic flat disc-shaped hub." The hub 11 is fixedly fitted on one end face of the flat ring-shaped permanent magnet, and the magnetic poles on the one end face of the flat ring-shaped permanent magnet are magnetically connected to each other. Only the magnetic poles on the other end face of the flat ring-shaped permanent magnet work as the rotor magnetic poles.

The permanent magnet generator 2 that can be incorporated in a 3.5" diskette is approximately 1.3 mm in thickness, as mentioned earlier. Its maximum size is 84 mm in width and 34 mm in length. Since the maximum width of the permanent magnet generator that can be incorporated in the diskette is determined by the diskette width of 90 mm, the maximum width is 84 mm. As the distance from the hub center to the central side end of the head slot 13 is about 17 mm, the one-side length of the permanent magnet generator 2 having the rotor 21 rotating together with the hub must be within 17 mm; the maximum length thereof being 34 mm. Since the diagonal length d of the permanent magnet generator 2 is up to 90 mm, the aspect ratio (thickness t/diagonal length d) in that case is about 2.5%. Although the width and length of the permanent magnet generator can be made smaller, it is impossible in terms of generator output to set the diagonal length to not more than 40 mm, the maximum aspect ratio is 6%.

Figure 9:
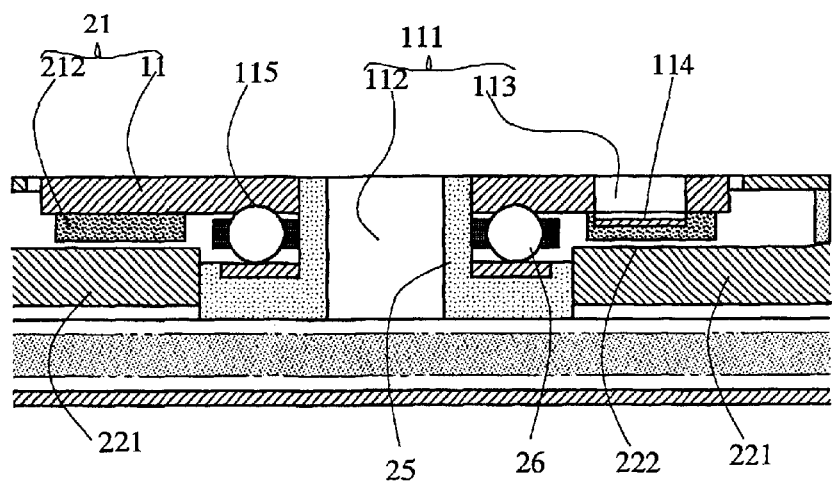
FIG. 9 is an enlarged cross-sectional view as shown in FIG. 4.

According to a preferred embodiment of the present invention, the flat ring-shaped permanent magnet 212 is concentrically fitted to an end face of the soft magnetic disc-shaped hub 11 to constitute the rotor 21. The rotor 21, which is caused to rotate around the rotational axis by engaging to the drive shaft of the external drive mechanism, that is, an FDD, has an engaging portion 111 on the hub 11 to engage with the drive shaft, as shown in FIG. 4 and FIG. 9 that shows the main part of FIG. 4. The engaging portion 111 comprises a center hole 112 provided at the center of the hub 11, and a recess 113 at a location about 9 mm apart from the center hole of the hub 11. The FDD drive mechanism has a 4 mm-diameter hook pin (the amount of protrusion: 0.5 mm) at a location about 9 mm apart from the center shaft fitted to the spindle motor. The center shaft is fitted to the center hole 112 provided on the hub center. The hook pin is fitted to the recess 113 provided on the hub surface eccentrically from the center thereof to transmit the rotation of the spindle motor to the rotor 21.

As the thickness of the hub 11 is set to approximately 0.6 mm, it is desirable that the recess 113 be a through hole provided on the hub, and that a recess leading to the through hole is provided on the surface of the flat ring-shaped permanent magnet 212 that makes contact with the hub 11, so that even when the hook pin of the external drive mechanism gets caught in the recess 113, the permanent magnet can be kept from being pushed by the pin. Since providing a recess on the permanent magnet would expose the inner surface of the recess to the outside via the opening of the recess. It is desirable, therefore, in preventing magnetic leakage that a bottom plate made of a soft magnetic material be bonded to the bottom surface of the recess on the permanent magnet 212.

In order to provide a recess 113 of 4 to 5 mm in diameter at a location radially 9 mm apart from the center of the center hole 112, the outside diameter of the hub 11 and the permanent magnet 212 should preferably be at least 24 mm.

In order to prevent the permanent magnet generator from interfering with the head slot 13 on the diskette for accepting the magnetic head of the FDD, the outside diameter of the hub 11 and the permanent magnet 212 should preferably be not more than 34 mm.

Figure 10:
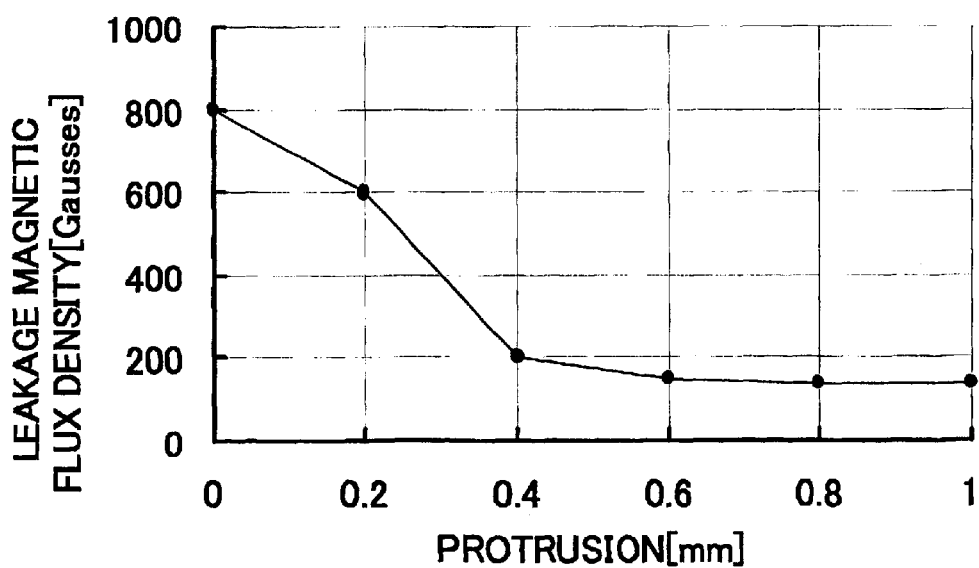
FIG. 10 is a graph illustrating the relationship between magnetic flux leakage and the amount of protrusion of the hub outer periphery from the outer periphery of the permanent magnet.

In the permanent magnet generator according to the present invention, the flat ring-shaped permanent magnet 212 is fixedly fitted to one end face of the soft magnetic disc-shaped hub 11 concentrically with the hub 11, as shown in FIGS. 3, 4, 5 and 9. The hub 11 is made slightly larger than the outside diameter of the permanent magnet 212, so that the outer periphery of the hub protrudes from the outer periphery of the permanent magnet preferably by not less than 0.3 mm, or more preferably by not less than 0.5 mm. Since an end face of the hub protrudes from the external surface of the generator, it is desirable to reduce magnetic leakage to the outside. The relationship between the leakage magnetic flux density (G) from the permanent magnet to the outside through the hub outer periphery and the protrusion (mm) of the hub outer periphery from the permanent magnet outer periphery is such that the leakage magnetic flux density is reduced to less than half when the amount of protrusion is not less than 0.3 mm, and to the minimum when the protrusion is not less than 0.5 mm, as shown in FIG. 10.

As is apparent from the above description, it is desirable that the outside diameter of the hub and the permanent magnet be 24 to 34 mm, and that the outside diameter of the permanent magnet be 0.6 mm or more (0.3 mm or more in diameter) smaller than that of the hub outside diameter.

The stator 22 of the generator has a plurality of magnetic pole teeth 221, each of which has on one end thereof a stator magnetic pole 222 at a location where the stator magnetic pole 222 can face the rotor magnetic pole via a gap in the axial direction. As shown in FIGS. 3 to 5, the stator magnetic pole on the magnetic pole tooth 221 is on the opposite-side end face of the flat ring-shaped permanent magnet 212 with respect to the hub 11. That is, the magnetic poles on one end face of the flat ring-shaped permanent magnet 212 are magnetically connected to each other by the soft magnetic disc-shaped hub 11, while the magnetic poles on the other end face of the flat ring-shaped permanent magnet 212 face or can face the stator magnetic poles 222.

Although the interval of the stator magnetic poles 222 is the same as that of the rotor magnetic poles, the distances between the adjoining stator magnetic poles changes in accordance with the width of the magnetic poles. The wider the distances of the stator magnetic poles the more effectively the magnetic flux from the rotor magnetic poles can be led to the magnetic pole teeth, though magnetic leakage from between the magnetic pole teeth increases. With this in mind, the distances between the stator magnetic poles should preferably be approximately 0.3 mm to 1.0 mm.

The magnetic pole teeth 221 are connected to each other at the other end by a soft magnetic back yoke 223. As is evident from FIGS. 1 to 5, seven magnetic pole teeth 221 are provided on the left side of the rotor 21, and four magnetic pole teeth 221 are provided on the right side. The magnetic pole tooth groups on the left and right sides are magnetically connected to each other by each of the soft magnetic back yokes 223. By dividing the magnetic pole teeth 221 into the left and right groups, the outline of the permanent magnet generator 2 can be made of an almost rectangular shape. With this, the outline of the permanent magnet generator 2 can be prevented from interfering with the input/output terminal 17, card contact terminal 16 and other electronic equipment. The rotor 21 and the stator 22 are supported by the generator housing 23, which is fixedly fitted to the diskette cover 14.

A stator coil 224 is wound on an intermediate portion between one end and the other end of the magnetic pole teeth 221. The stator coil 224 is connected in series, or in such a manner as to obtain a total output by adjusting the output phase. Since the method of connecting coil wires is well known to those skilled in the art, its description has been omitted here.

In the permanent magnet generator according to the present invention, the magnetic pole teeth 221 and the rotor permanent magnet 212 face each other via a small axial gap, as shown in FIGS. 4 and 9. The size of the gap is therefore maintained by supporting the stator and the rotor by an antifriction bearing 26 to receive the thrust load.

The tips of the magnetic pole teeth 221, that is, those on the side having the stator magnetic poles, are positioned by fixedly fitting to a bush 25, and the antifriction bearing 26 is provided between the bush 25 and the hub 11. As a result, even if a large thrust load is applied, the rotor can be easily rotated by the aid of the antifriction bearing. The hub surface and the bush surface which balls of the antifriction bearing contacts should preferably have a hardness of not less than HRC 35 to prevent wear. Recommended materials for the hub include a surface-nitrided magnetic stainless steel or a quenched carbon steel (JIS S45C). The portion of the bush 25 close to the tip of the magnetic pole tooth, which must be non-magnetic, should preferably be made of beryllium copper, non-magnetic stainless steel, etc. Provision of a U-shaped groove 115 on the portion of the hub surface where balls of the antifriction bearing come in rolling contact could help secure the relative position of the bearing and the hub.

The flat ring-shaped permanent magnet 212 must have an inside diameter of not less than 12 mm to prevent interference with the antifriction bearing 26 and the retainer thereof. The tip of the magnetic pole tooth on the side of the magnetic pole should protrude radially inward preferably by not less than 0.3 mm, or more preferably by not less than 0.5 mm, from the central opening of the flat ring-shaped permanent magnet 212. Protrusion of the tip of the magnetic pole tooth by not less than 0.3 mm can reduce magnetic flux leakage from the permanent magnet to the rear of the magnetic pole tooth tip to less than half. Protrusion of the magnetic pole tooth tip by not less than 0.5 mm can minimize magnetic flux leakage.

As shown in FIG. 4 that is a cross-sectional view of the permanent magnet generator 2, each magnetic pole tooth 221 has an almost S-shaped cross section in the longitudinal direction having a step distance in the axial direction of the rotor. With this construction, each magnetic pole tooth 221 is positioned on the bottom surface of the generator at an end thereof having the stator magnetic pole 222, and positioned at the center of the generator in the through-the-thickness direction at the other end thereof connected to the intermediate portion on which the stator coil 224 is wound and the back yoke 223. With this construction, the combined total of the hub, the permanent magnet, magnetic gap and the magnetic pole tooth becomes close to the thickness of the stator coil (approximately 2.0 mm including the magnetic pole tooth because the stator coil is wound on the magnetic pole tooth).

To provide a step distance at the central part of the magnetic pole tooth, it is recommended that an inclined portion is provided at a location corresponding to the step distance at an angle of 30 to 60 degrees with respect to the longitudinal direction of the entire magnetic pole teeth. Too much an angle of inclination could reduce the cross-sectional area of the bent portion, resulting in an excessive increase in magnetic resistance.

In this case, if the thickness of the hub is set to 0.8 mm, the thickness of the permanent magnet to 0.5 mm, the size of the magnetic gap to 0.2 mm, the thickness of the magnetic pole tooth can be about 0.8 mm, bringing the combined total to 23 mm. In the stator coil portion, if the thickness of the stator coil is set to 2.0 mm, the thickness of the generator housing to 0.3 mm, the combined total thickness becomes 2.3 mm. In this way, the thickness of the generator can be limited within 2.3 mm from the end face on the rear plate side of the diskette case.

Now, let us verify that when a 0.8 mm-thick magnetic pole tooth 221 is used, the magnetic pole tooth can pass the magnetic flux generated from the rotor permanent magnet.

Assuming that the number of magnetic poles of the rotor permanent magnet is N, the outer radius is R, the inner radius is r, the area per pole is $S_R$, the magnetic flux density at the working point is Bd, the average magnetic flux density at the magnetic gap is Bg, the thickness of the magnetic pole tooth is t, the width of a magnetic pole tooth is Ws, the saturated magnetic flux density is Bs, the following conditions must hold to allow all the gap magnetic flux pass the magnetic pole teeth.

$$S_R \cdot Bg - (\text{magnetic flux leakage}) \leq Ws \cdot t \cdot Bs.$$

If the magnetic flux leakage is disregarded, then $$S_R \cdot Bg \leq Ws \cdot t \cdot Bs.$$

Supposing that the distribution of the surface magnetic flux density of the rotor magnetic poles of the rotor permanent magnet (that is, the magnetic flux density at the magnetic gap) is represented graphically by a sine curve, the relationship of $Bg = 2/\pi \cdot Bd$ holds between the magnetic flux density at the working point Bd and the average magnetic flux density at the magnetic gap Bg.
It follows from these equations that $$S_R \cdot 2/\pi \cdot Bd \leq Ws \cdot t \cdot Bs.$$

Furthermore, since $$Ws \approx 2\pi R/N,$$

then $$Bd \leq \pi Rt/(R^2 - r^2) \cdot Bs,$$

based on $$\pi/N \cdot (R^2 - r^2) \cdot 2/\pi \cdot Bd \leq 2\pi R/N \cdot t \cdot Bs.$$

As shown in FIGS. 3 and 4, a rotor permanent magnet 212 having almost the same outside diameter as the hub 11 of a 3.5" floppy disk, that is, an outside diameter of 12 mm and the inside diameter of 6 mm, is used. When normal soft iron is used for the magnetic pole teeth, the saturated magnetic flux density Bs is not less than 1.5T, and when soft magnetic iron is used, the corresponding figure is not less than 2.2T. Consequently, Bs is set to 1.7T. The magnetic pole tooth thickness t is set to 0.8 mm, as in the above case. Substitution of these figures into the above equation leads to the equation below.

$$Bd \leq \pi \cdot 12 \cdot 0.8/(144 - 36) \cdot 1.7 = 0.47(T).$$

Thus, when the magnetic flux density at the working point is not more than 0.47, all the magnetic flux can be passed through the magnetic pole teeth. Since a magnetic circuit has a magnetic leakage of at least scores of percent, and some magnetic resistance, it is indicated that as long as the magnetic flux at the working point is about 0.6T, all the magnetic flux can be passed through the magnetic pole teeth.

The magnetic pole teeth used in the present invention have such a low magnetic resistance as to permit magnetic flux to flow in them. Since stator coils are wound in the middle of these magnetic pole teeth, changes in magnetic flux along with the rotation of the permanent magnet rotor can be picked up without generating waste. Thus, a generator having a high power output can be obtained.

Both the magnetic pole teeth 221 and the back yoke 223 of the stator 22 are made of a soft magnetic material. Having a high saturation magnetic flux density Bs is favorable in reducing the size of the entire generator by reducing the cross-sectional area of components. Consequently, a soft iron, magnetic soft iron, powder magnetic core, silicon steel containing 4 to 6 mass % Si, or magnetically annealed low carbon steel of a carbon content of not more than 0.05 mass %, all having a saturation magnetic flux density of more than 1.2T, or more preferably not less than 1.5T, can be used for the stator magnetic pole teeth. For back yokes in which so much magnetic flux is not passed as in the magnetic pole teeth, low carbon steel of a carbon content of not more than 0.6 mass % can be used.

For the permanent magnet 212 used in the rotor 21, a segment-shaped, rectangular shaped, or disc-shaped permanent magnet may be used. However, a flat ring-shaped permanent magnet 212 as shown in FIGS. 6 to 8 is more preferable. The permanent magnet 212 is fixedly fitted to an end face of the hub 11 by adhesive. The permanent magnet has an appropriate length, that is, an appropriate thickness, in the direction of the rotational axis. Since the thickness of the thin type permanent magnet generator that can be incorporated in a 3.5" diskette is 2.0 to 2.5 mm, the thickness of the permanent magnet is 1.0 mm at most, or more preferably 0.3 to 0.8 mm, though that of 0.3 to 1.0 mm in thickness can be used for the purpose. That is, the thickness in the magnetization direction of the permanent magnet is not less than about 10% and not more than 30%, or more preferably not less than about 10% and not more than 23%, of the diskette thickness. To reduce the magnetic resistance at the magnetic gap, the gap between the magnet and the stator magnetic poles is not less than 2% and not more than 15%, more preferably not less than 5% and not more than 15%, of the diskette thickness. It is apparent, however, that this size can vary depending on the size of the diskette to be used, or the construction of equipment to be incorporated together.

It is desirable in terms of magnetomotive force that the thickness in the magnetization direction of the disc-shaped permanent magnet 212 be as large as possible. However, providing a soft magnetic piece, or a hub 11 made of a soft magnetic material on an end face and magnetically short-circuiting between the magnetic poles on the end face tends to lengthen the effective distance between the magnetic poles of the permanent magnet.

As for the characteristics of a permanent magnet, magnetic flux density distribution along the surface of the rotor magnetic poles should preferably be almost a sine curve. The magnetic flux density distribution can be measured with a gauss meter along the surface of the magnetic poles of the magnetized rotor permanent magnet. The magnetic flux density distribution in a closed magnetic circuit can be measured by combining the stator with the rotor, placing the probe of the gauss meter on the stator, and causing the rotor to rotate. The magnetic flux density distribution in an open circuit can be measured with a similar setup without using the stator.

When the magnetic flux density distribution is almost a sine curve, there are no steep changes in the magnetic flux density between the magnetic poles of the rotor, and the cogging torque of the rotor is reduced. Magnetic flux density distribution is almost a sine curve when the area around the center of the magnetic poles is magnetized most intensely, with magnetization gradually weakening as it is away from the center, and the magnetization reversal point (at which the radial component of a magnetic flux density is zero) lies at the center of the two magnetic poles of different polarities. Cogging torque can be reduced by magnetic flux density distribution that is a sine curve because the attraction of the stator magnetic poles and the rotor magnetic force is determined by this magnetic force.

Figure 11:
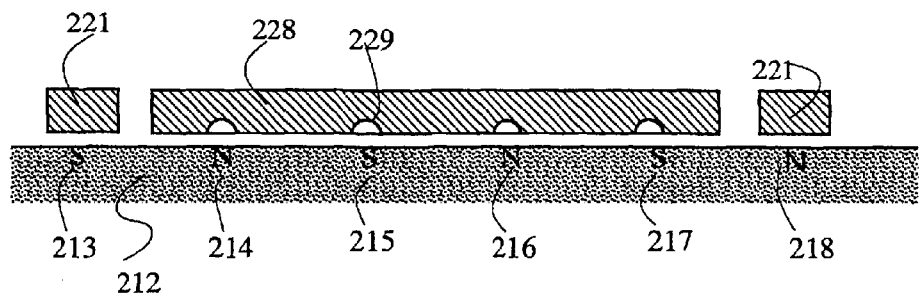
FIG. 11 is an enlarged cross-sectional view taken along line 11–11 in FIG. 5.

When the magnetic poles of the magnetic pole teeth face the rotor magnetic poles simultaneously, several poles of the rotor magnetic poles do not face the magnetic pole tooth (stator) magnetic poles in FIG. 5. Soft magnetic pieces 228 and 228' are provided at location facing the rotor magnetic poles that do not face the stator magnetic poles, as shown in FIG. 5. To facilitate the understanding of the relative positions of the soft magnetic piece 228 and the rotor permanent magnetic, an enlarged cross-sectional view taken along line 11—11 of FIG. 5 is shown in FIG. 11. The soft magnetic piece 228 extends, starting from the middle of the rotor magnetic poles S213 and N214, facing the rotor magnetic poles N214, S215, N216 and S217, to the middle of the rotor magnetic poles S217 and N218. The soft magnetic piece 228 connects the middle parts of the five successive rotor magnetic poles. The soft magnetic piece 228' extends, starting from the middle of the rotor magnetic poles S213' and N214', facing N214', to the middle of N214' and S215' and connects the middle of the two successive magnetic poles. The soft magnetic pieces 228 and 228' have grooves 229 and 229' extending in the radial direction on the surface facing S and N poles. (Refer to FIG. 11.)

When the stator magnetic poles are at positions facing the rotor magnetic poles, soft magnetic pieces 228 and 228' for connecting the magnetic poles are provided on the inner circumferential surface of the stator facing the rotor magnetic poles that do not face the stator magnetic poles. There are grooves (extending in the radial direction) 229 and 229' on the soft magnetic pieces 228 and 228' at positions facing the rotor magnetic poles. When the rotor magnetic poles are at positions not aligning with the stator magnetic poles, the rotor magnetic poles are shifted from the position of the groove at the soft magnetic piece, and approach the protruded portions of the soft magnetic pieces. Thus, the soft magnetic pieces short-circuit the rotor magnetic poles. At this time, the soft magnetic pieces attract the rotor magnetic poles which face the protruded portions of the soft magnetic pieces. When the rotor magnetic poles are at positions facing the stator magnetic poles, on the other hand, the grooves extending in the radial direction on the soft magnetic pieces face the rotor magnetic poles, making the stationary state of the rotor magnetic poles at that position unstable, acting to cause the rotor to move in the direction of the protruded portions of the soft magnetic pieces.

The rotor magnetic poles facing the stator magnetic poles act to cause the rotor to move to the positions where they face the stator magnetic poles, while the rotor magnetic poles facing the soft magnetic pieces act to cause the rotor to move from those positions, thereby reducing the cogging torque of the rotor.

The term "middle" in the above description stating that "the soft magnetic piece 228 extends, starting from the middle of the rotor magnetic poles S213 and N214,—to the middle of the rotor magnetic poles S217 and N218" does not necessarily mean the exact midpoint of the adjoining magnetic poles having different polarities among the multiple magnetic poles arranged on the end face of the flat ring-shaped permanent magnet, but means the peripheral part except the approximate center of the magnetic poles. When a certain rotor magnetic pole faces a stator magnetic pole, and another rotor magnetic pole faces a groove provided on the soft magnetic piece, it is suffice that an end of the soft magnetic piece is shifted from the rotor magnetic pole to such an extent that the attraction at the position where the rotor magnetic pole faces the groove is reduced, generating a rotational moment as the rotor magnetic pole is attracted by the soft magnetic piece by the side of that groove.

Considering the magnitude of magnetic flux density and coercive force, the permanent magnet should preferably be a sintered magnet, particularly a sintered NdFeB magnet. A bonded NdFeB magnet has about ⅔ of the magnetic properties of a sintered NdFeB magnet.

Figure 12:
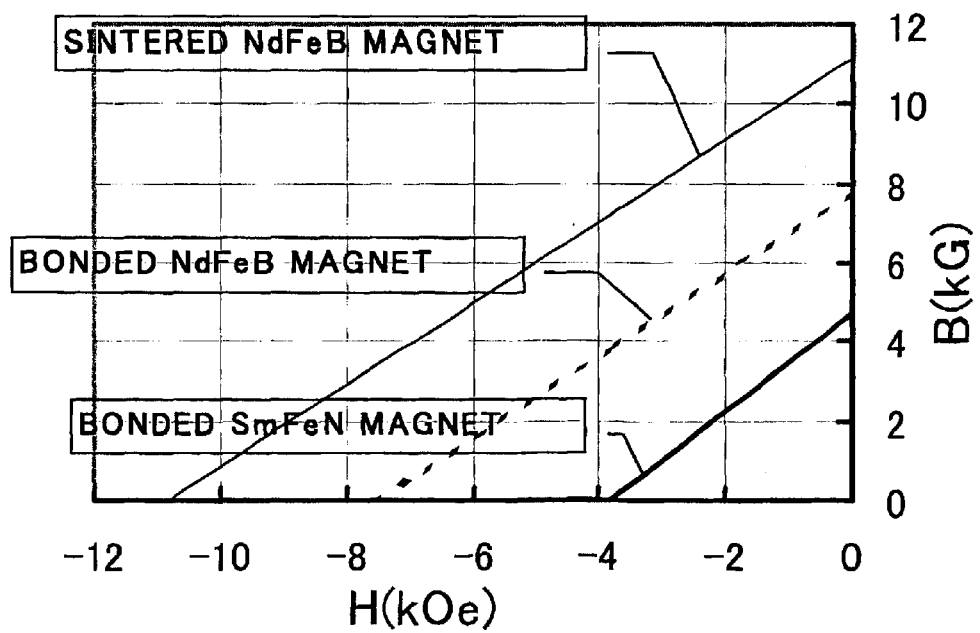
FIG. 12 is a magnetic characteristic diagram of the permanent magnet used in the present invention.

The permanent magnet used for the rotor of a permanent magnet generator embodying the present invention as described above has a permeance cofficient of 0.8 before it is assembled into the generator, or more than 2.5 after assembled, or more preferably about 3. A sintered NdFeB magnet having magnetic properties as shown in the graph of FIG. 12 has about 0.83T (8300G) of magnetic flux density at the working point in the assembled state, while the corresponding figure for a bonded NdFeB magnet is about 0.58T (5800G). Taking into account the cross-sectional area of the magnetic pole teeth as described above, a bonded NdFeB magnet suffices for the purpose. When comparing the sintered and bonded NdFeB magnets, the bonded NdFeB magnet is more desirable in terms of manufacturing cost and ease of manufacture.

When manufacturing a sintered NdFeB magnet of about 0.5 mm in thickness, a sintered material of a thickness more than twice the desired thickness is ground by a grinder to a 0.5 mm thickness, and then the inner and outer circumferences are ground to desired dimensions. The bonded NdFeB magnet, on the other hand, is manufactured by compressing a mixture of a resin binder and NdFeB magnetic powder to a flat ring-shaped permanent magnet of a desired size, or rolling the mixture with rolls into a sheet of a desired thickness, punching the sheet to obtain a flat ring-shaped bonded magnet. In this way, the bonded NdFeB magnet is suitable for the present invention because its magnetic properties meet the requirements for the present invention and in terms of the ease of manufacture.

Aside from the NdFeB magnet, (1) the nitride magnet, such as the SmFeN magnet, (2) what is called the exchange spring magnet, such as an SmFeN magnet containing alpha iron, an NdFeB magnet containing alpha iron, an NdFeB containing $Fe_3B$, (3) the HDDR (hydrogenation, decomposition, dehydrogenation, and recombination) magnet, such as NdFeB and SmFeN magnets, and (4) the SmCo magnet can also be used as the permanent magnet for the permanent magnet generator according to the present invention. Among these, the nitride magnet, such as the SmFeN magnet, is suitable for the present invention because it has relatively good properties in the form of a sheet-like bonded magnet. Magnetic properties on the BH demagnetization curve of the bonded SmFeN magnet are such that residual magnetic flux density is approximately 0.47T (4700G), coercive force, bHc, is 300 kA/m (3770 Oe), as shown in FIG. 12. Consequently, the magnetic flux density at the working point is approximately 0.33T (3300G). This results in a slightly decreased output.

FIGS. 5 to 8 show a permanent magnet generator having 16 magnetic poles on an end face of a disc-shaped permanent magnet 212. In the present invention, the number of poles should preferably be 12 to 24, or more preferably 16 to 20 poles. Reducing the number of poles increase the amount of magnetic flux per pole, but the largest generator output can be obtained with 16 to 24 magnetic poles. Increasing the number of poles would reduce the space between magnetic pole teeth extending in the radial direction of the stator, and make the manufacture of the stator difficult, producing the problem of distortion in the voltage waveform of the output. Thus, the optimum number of magnetic poles is 16 to 20.

The magnetic poles of the outward extending magnetic pole teeth should preferably be installed at the same angular intervals so that they can face the magnetic poles of the rotor permanent magnet via magnetic gaps.

The diskette incorporating the permanent magnet generator embodying the present invention will be described in more detail with reference to the following experiment, together with the description of the conditions of the experiment.

Experiment

Figure 13A:
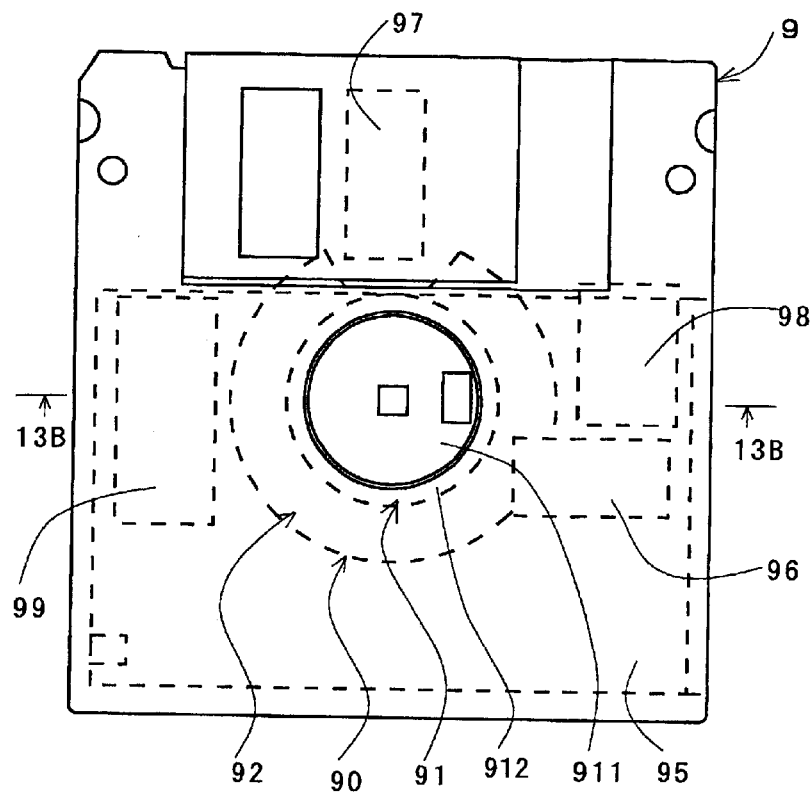
FIG. 13A being a plan view, FIG. 13B a 13B–13B cross-sectional view, and FIG. 13C an enlarged view of the essential part of FIG. 13B.
Figure 13B:
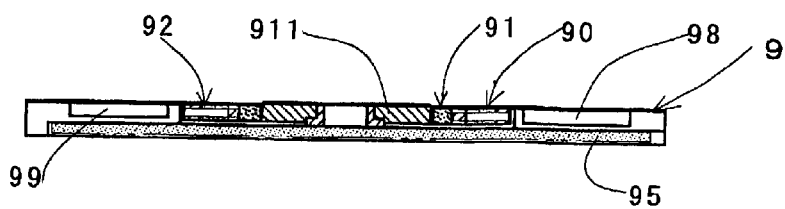
FIG. 13 shows a diskette having a permanent magnet generator for which a patent application was filed.
Figure 13C:
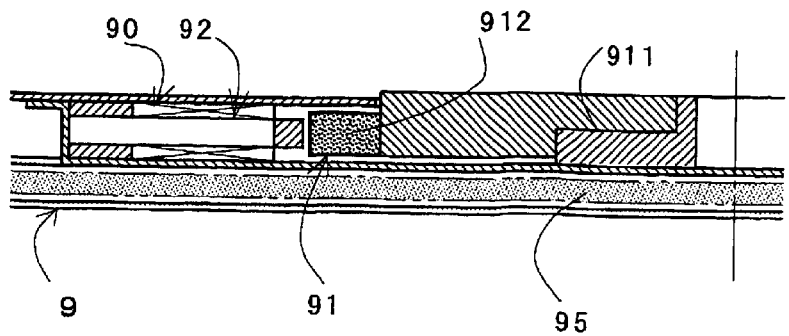

The diskette incorporating the thin type permanent magnet generator embodying the present invention as shown in FIGS. 1 to 9, and the diskette incorporating the thin type permanent magnet generator according to a previous patent application, as shown in FIG. 13, were manufactured, and their properties were measured. Specifications of these diskettes and permanent magnet generators are shown in TABLES 2 and 3.

TABLE 2

| Item | Description |
| --- | --- |
| Diskette | 3.5" diskette |
| Revolution of hub (revolution of permanent magnet rotor) | 300 rpm |
| Outside dimension of generator | 80 mm (length) × 30 mm (width) × 2.3 mm (thickness) Aspect ratio: 2.6% |
| Dimension of rotor permanent magnet | 24 mm (O.D.) × 12 mm (I.D.) × 0.5 mm (thickness) |
| Permanent magnet | Bonded NdFeB isotropic permanent magnet (magnetic properties shown in FIG. 12.) |
| No. of rotor magnetic poles | 16 poles Magnetic poles are arranged on an end face of the disc-shaped permanent magnet; the magnetic flux density of the magnetic gap being almost a sine curve. |
| Material of stator | Cold-rolled steel sheet SPCC, saturated magnetic flux density Bs: 1.5 T |
| Thickness of stator | 0.8 mm |
| No. of stator magnetic poles | Total 11 poles Opposing type having 7 poles on the left side and 4 poles on the right; with stator magnetic poles facing the rotor magnetic poles on an end of rotor magnet, as shown in FIGS. 3 to 5 |
| Stator winding | No. of turns 300 turns/pole, wire dia.: 0.14 mm Winding resistance: 44 Ω(for 11 poles) Connection: Series |
| Magnetic gap | 0.2 mm |
| Permeance coefficient | 3.0 |

TABLE 3

| Item | Description |
|---|---|
| Diskette | 3.5" diskette |
| Revolution of hub (revolution of permanent magnet rotor) | 300 rpm |
| Outside dimension of generator | 56 mm (O.D.) × 2 mm (thickness)<br>Aspect ratio: 3.6% |
| Dimension of rotor permanent magnet | 29 mm (O.D.) × 25 mm (I.D.) × 2 mm (thickness)<br>The ring magnet is secured on the outer periphery of the hub. |
| Permanent magnet | Sintered NdFeB anisotropic permanent magnet (magnetic properties almost equal to those of sintered NdFeB magnet shown in FIG. 12.) |
| No. of rotor magnetic poles | 16 poles Magnetic poles of alternately different polarities are arranged in the circumferential direction on the outer cylindrical surface of the ring-shaped permanent magnet; the magnetic flux density in the magnetic gap being almost a sine curve. |
| Material of stator | Cold-rolled steel sheet SPCC, saturated magnetic flux density Bs: 1.5 T |
| Thickness of stator | 1.2 mm |
| No. of stator magnetic poles | Total 11 poles<br>Opposing type having 7 poles on the left side and 4 poles on the right; with stator magnetic poles facing the outer circumferential surface of the rotor magnetic poles |
| Stator winding | No. of turns 300 turns/pole, wire dia.: 0.14 mm<br>Winding resistance: 44 Ω (for 11 poles)<br>Connection: Series |
| Magnetic gap | 0.2 mm |
| Permeance coefficient | 4.0 |

TABLE 4

| Diskette | | Amount of magnetic flux per pole | Power generation output | Magnetic flux leakage |
|---|---|---|---|---|
| This invention (TABLE 2) | | 10 Wb | 43 mW | 0.01 T |
| Comparative example (TABLE 3) | Without shield plate | 7 Wb | 30 mW | 0.03 T |
| | With shield plate | 4.6 Wb | 20 mW | 0.01 T |

Measurements of the amount of magnetic flux per rotor magnetic pole, power generation output, and the intensity of magnetic field leaked to the memory card space for permanent magnet generators used in these diskettes are shown in TABLE 4. The diskette according to the present invention has no shield plate between the permanent magnet generator and the memory card space. Since the diskette of the comparative example without a shield plate between the permanent magnet generator and the memory card space has a large magnetic flux leakage, measurements for the diskette with a 0.1 mm-thick permalloy shield plate are also shown in the table.

As is evident from this experiment, despite the use of a bonded NdFeB permanent magnet, the present invention has an increased amount of magnetic flux per pole, leading to an increase in power generation output, compared with the comparative example. The comparative example without a shield plate has a high intensity of magnetic flux leakage to the memory card space, which could adversely affect the memory card inserted in the memory card space. The diskette of the present invention has a far less magnetic field leakage to the memory card space.

As described above, the thin type permanent magnet generator according to the present invention can increase the output of the generator even with an inexpensive bonded magnet. As a result, an output of more than 40 mW can be accomplished, and the diskette incorporating this generator can serve as an adapter usable for the 5V IC card that is predominant in the marketplace.

Furthermore, with the thin type permanent magnet generator embodying the present invention, magnetic flux leakage can be reduced, and the adverse effects of magnetic flux leakage on the memory card and the diskette can be eliminated.

What is claimed is:

1. A diskette incorporating a thin type permanent magnet generator comprising
   a diskette case of a floppy magnetic disc shape,
   a disc-shaped rotor having a soft magnetic disc-shaped hub provided inside the diskette and caused to rotate around a rotational axis by an external drive mechanism, and a flat ring-shaped permanent magnet concentrically fitted to an end face of the hub; the permanent magnet being axially magnetized so as to have a plurality of magnetic poles of alternately different polarities in the circumferential direction on each end face thereof; and the magnetic poles on an end face of the permanent magnet being magnetically short-circuited by the hub, and the magnetic poles on the other end face serving as rotor magnetic poles, and
   a stator fitted to the diskette case having a plurality of magnetic pole teeth having on an end each of a plurality of stator magnetic poles that can face the rotor magnetic poles at the same pole intervals via an axial gap and extending radially outward from the state magnetic poles; the magnetic pole teeth being connected at the other end to each other by a soft magnetic yoke and having coils wound on the intermediate portions thereof; the ratio of generator thickness/diagonal length on the end face of the generator is not more than 6%.

2. A diskette as set forth in claim 1, wherein the thickness in the magnetizing direction of the permanent magnet is not less than 10% and not more than 30% of the thickness of the diskette, and a gap between the magnet and the stator magnetic poles is not less than 2% and not more than 15% of the thickness of the diskette.

3. A diskette as set forth in claim 1, wherein the outer periphery of the hub protrudes not less than 0.3 mm from the outer periphery of the permanent magnet.

4. A diskette as set forth in claim 3, wherein an end of each of the magnetic poles on the side facing the rotor magnetic poles protrudes not less than 0.3 mm radially inward to the central opening of the permanent magnet.

5. A diskette as set forth in claim 4, wherein a distance between portions of the adjacent stator magnetic poles facing the rotor magnetic poles is 0.3 mm to 1.0 mm.

6. A diskette as set forth in claim 5, wherein the outside diameter of the permanent magnet is 24 to 34 mm, and the inside diameter thereof is not less than 12 mm.

7. A diskette as set froth in claim 6, wherein the magnetic pole teeth have axial step differences between the portion thereof facing the rotor magnetic poles and the portion thereof on which coils are wound; the overall thickness being reduced by the step difference.

8. A diskette as set forth in claim 7, wherein the magnetic pole teeth each have an inclined portion at the step difference; the inclined portion having a 30 to 60° angle with respect to the longitudinal direction of the entire magnetic pole teeth.

9. A diskette as set forth in claim 8, wherein the permanent magnet is a bonded magnet containing SmFeN magnetic powders or NdFeB magnetic powders, or a sintered NdFeB magnet.

10. A diskette as set forth in claim 9, wherein the permanent magnet is a bonded NdFeB magnet containing NdFeB magnetic powders.

11. A diskette as set forth in claim 10, wherein the hub is supported by an anti-friction bearing so as to be rotatable around the rotational axis.

12. A diskette as set forth in claim 11, wherein the portion of the hub which comes in contact with balls of the anti-friction bearing has a hardness of not less than HRC35.

13. A diskette as set forth in claim 12, wherein the portion of the hub which comes in contact with balls of the anti-friction bearing has a U-shaped groove.

14. A diskette as set forth in claim 1, wherein a distance between portions of the adjacent stator magnetic poles facing the rotor magnetic poles is 0.3 mm to 1.0 mm.

15. A diskette as set forth in claim 1, wherein the outside diameter of the permanent magnet is 24 to 34 mm, and the inside diameter thereof is not less than 12 mm.

16. A diskette as set froth in claim 1, wherein the magnetic pole teeth have axial step differences between the portion thereof facing the rotor magnetic poles and the portion thereof on which coils are wound; the overall thickness being reduced by the step difference.

17. A diskette as set forth in claim 16, wherein the magnetic pole teeth each have an inclined portion at the step difference; the inclined portion having a 30 to 60° angle with respect to the longitudinal direction of the entire magnetic pole teeth.

18. A diskette as set forth in claim 1, wherein the permanent magnet is a bonded magnet containing SmFeN magnetic powders or NdFeB magnetic powders, or a sintered NdFeB magnet.

19. A diskette as set forth in claim 18, wherein the permanent magnet is a bonded NdFeB magnet containing NdFeB magnetic powders.

20. A diskette as set forth in claim 1, wherein the hub is supported by an anti-friction bearing so as to be rotatable around the rotational axis.

21. A diskette as set forth in claim 20, wherein the portion of the hub which comes in contact with balls of the anti-friction bearing has a hardness of not less than HRC35.

22. A diskette as set forth in claim 21, wherein the portion of the hub which comes in contact with balls of the anti-friction bearing has a U-shaped groove.

23. A diskette as set forth in claim 1, wherein an engaging portion for engaging with an external drive mechanism is provided on an end face of the hub; the engaging portion comprising a central hole provided at the center of the hub and a recess provided at a location displaced from the central hole on the hub surface;

the recess comprising a through hole provided on the hub and a recess provided on the permanent magnet surface extending from the through hole.

24. A diskette as set forth in claim 23, wherein a bottom plate made of a soft magnetic material is fitted into the recess provided on the permanent magnet surface.

25. A diskette as set forth in claim 1, wherein a memory card space is provided in the diskette case adjacent to the permanent magnet generator, and the end face of the permanent magnet generator which end face has the stator magnetic teeth is on the side of the memory card space with respect to the disc shaped rotor.

* * * * *